(No Model.)
H. MAYCOCK.
DIPPER HANDLE.
No. 434,351. Patented Aug. 12, 1890.
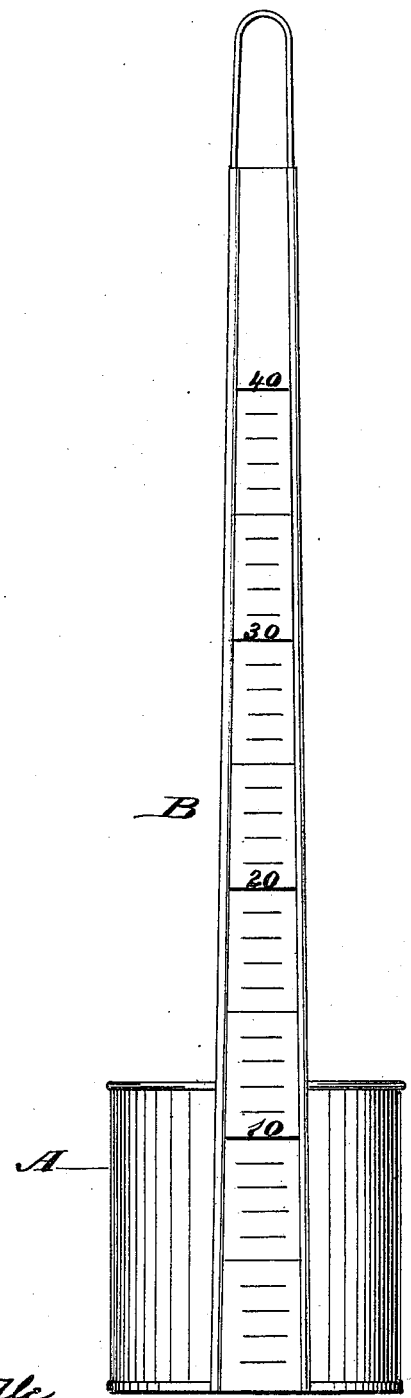
WITNESSES:
F. McArdle
C. Sedgwick
INVENTOR:
H. Maycock
BY
Munn & Co.
ATTORNEYS

UNITED STATES PATENT OFFICE.

HENRY MAYCOCK, OF NEW YORK, N. Y.

DIPPER-HANDLE.

SPECIFICATION forming part of Letters Patent No. 434,351, dated August 12, 1890.

Application filed March 15, 1890. Serial No. 344,013. (No model.)

*To all whom it may concern:*

Be it known that I, HENRY MAYCOCK, of the city, county, and State of New York, have invented a new and Improved Dipper-Handle, of which the following is a full, clear, and exact description.

My invention relates to improvements in dipper-handles, and especially to the handles of milk-dippers; and the object of my invention is to provide a simple, inexpensive, and efficient means for quickly and accurately measuring the amount of liquid in a given receptacle.

To this end my invention consists in providing a vertical handle of a dipper with gage-marks to indicate the amount of liquid contained in a receptacle. This construction will be hereinafter fully described, and specifically pointed out in the claim.

Reference is to be had to the accompanying drawing, forming a part of this specification, in which the figure represents a rear elevation of a dipper provided with a handle embodying my invention.

The dipper-bowl A is of the usual construction, and represents a milkman's quart-dipper bowl. It is provided with a long vertical handle B, and, as shown in the drawing, the dipper represents the long-handled dipper used by milkmen in dipping milk from forty-quart cans, the handle B being long enough to extend from top to bottom of the can.

Upon one side of the handle B horizontal gage-marks are made, each mark representing a quart, every fifth mark being indicated by a longer mark, and every tenth mark by a numeral, as shown. The gage-marks are arranged to read from bottom to top of the handle, and are so spaced in relation to the capacity of the can in which the dipper is used that the distance from the lower mark to the bottom of the handle or between two of the marks will correspond to the height of one quart in the can. The dipper-bowl A should hold a quart, but may be made to hold a larger or smaller quantity, and it is used in the usual manner for dipping milk.

To ascertain the amount of milk in a can, the dipper-bowl A is sunk to the bottom, and upon withdrawing the dipper the height of milk in the can will be shown by a line of moisture upon the handle B, and the gage-mark nearest said moisture-line will indicate the number of quarts in the can. It will thus be seen that when a customer wants a large quantity of milk the amount may be easily determined by the handle B and the trouble and bother of measuring it quart by quart dispensed with.

While I have described the dipper and handle as adapted to be used in connection with forty-quart milk-cans, it is evident that the device may be adapted to different-sized cans and used for measuring other liquids, as well as milk. It is obvious, too, that the shape of the handle may be changed to suit the taste and that the gage-marks thereon may be divided to measure a smaller amount than a quart.

Having thus described my invention, what I claim as new, and desire to secure by Letters Patent, is—

The combination, with a dipper-bowl, of a vertical handle having gage-marks thereon, substantially as and for the purpose specified.

HENRY MAYCOCK.

Witnesses:
WARREN B. HUTCHINSON,
C. SEDGWICK.